United States Patent
Kashmiri

(10) Patent No.: US 11,914,037 B2
(45) Date of Patent: Feb. 27, 2024

(54) LIDAR TIME-OF-FLIGHT AND INTENSITY DETECTION SIGNAL-PATH BASED ON PHASE-CODED MULTI-PULSE TRANSMISSION AND SINGLE-BIT OVERSAMPLED MATCHED FILTER DETECTION

(71) Applicant: Robert Bosch GmbH, Stuttgart (DE)

(72) Inventor: Sayyed Mahdi Kashmiri, San Jose, CA (US)

(73) Assignee: Robert Bosch GmbH, Stuttgart (DE)

( * ) Notice: Subject to any disclaimer, the term of this patent is extended or adjusted under 35 U.S.C. 154(b) by 779 days.

(21) Appl. No.: 16/965,405

(22) PCT Filed: Jan. 29, 2019

(86) PCT No.: PCT/EP2019/052094
§ 371 (c)(1),
(2) Date: Jul. 28, 2020

(87) PCT Pub. No.: WO2019/149688
PCT Pub. Date: Aug. 8, 2019

(65) Prior Publication Data
US 2021/0072382 A1    Mar. 11, 2021

Related U.S. Application Data

(60) Provisional application No. 62/624,185, filed on Jan. 31, 2018.

(51) Int. Cl.
*G01S 17/26* (2020.01)
*G01S 7/484* (2006.01)
(Continued)

(52) U.S. Cl.
CPC .............. *G01S 17/26* (2020.01); *G01S 7/484* (2013.01); *G01S 7/4861* (2013.01); *G01S 7/4865* (2013.01)

(58) Field of Classification Search
CPC ........ G01S 7/484; G01S 7/4861; G01S 7/486; G01S 17/26
See application file for complete search history.

(56) References Cited

U.S. PATENT DOCUMENTS 5,243,553 A * 9/1993 Flockencier .......... G01S 7/4802
356/5.03
6,522,395 B1   2/2003 Bamji et al.
(Continued)

FOREIGN PATENT DOCUMENTS

DE          102 25 869 A1    4/2003
DE      10 2012 112 985 B3   12/2013
(Continued)

OTHER PUBLICATIONS

International Search Report corresponding to PCT Application No. PCT/EP2019/052094, dated Apr. 24, 2019 (4 pages).
(Continued)

*Primary Examiner* — Luke D Ratcliffe
(74) *Attorney, Agent, or Firm* — Maginot, Moore & Beck LLP

(57) ABSTRACT

A light detection and ranging (Lidar) system includes a light transmission component driven by a phase-keyed burst pattern generator operable to apply a phase-coded key for activating the light source in a series of on/off pulses for the transmitted TX light. The on/off sequence is chosen such that the pattern's auto-correlation function has a maximized peak to side lobe ratio. The on/off pulses of the received RX light reflected from the object or scene is converted to a bitstream that is cross-correlated with the phase-coded key. A peak detector finds the peak of the cross-correlation function and generate a time-of-flight signal indicative of the time between the transmission of the TX light and the peak of the cross-correlation function.

14 Claims, 13 Drawing Sheets

(51) Int. Cl.
  *G01S 7/4861* (2020.01)
  *G01S 7/4865* (2020.01)

(56) References Cited

U.S. PATENT DOCUMENTS

| | | | |
|---|---|---|---|
| 6,919,716 | B1 | 7/2005 | Buehler |
| 7,969,558 | B2 | 6/2011 | Hall |
| 9,086,275 | B2 | 6/2015 | Weinberg et al. |
| 2002/0093640 | A1* | 7/2002 | Watanabe ............. G01S 13/325 356/5.01 |
| 2009/0059201 | A1 | 3/2009 | Willner et al. |
| 2013/0258312 | A1* | 10/2013 | Lewis .................. G01S 7/4865 356/4.01 |
| 2017/0016981 | A1 | 1/2017 | Hinderling et al. |
| 2017/0155225 | A1 | 6/2017 | Villeneuve et al. |
| 2017/0219695 | A1 | 8/2017 | Hall et al. |
| 2017/0269209 | A1 | 9/2017 | Hall et al. |
| 2017/0329010 | A1* | 11/2017 | Warke .................... G01S 17/10 |

FOREIGN PATENT DOCUMENTS

| | | |
|---|---|---|
| EP | 2 626 722 A1 | 8/2013 |
| WO | 2018/086945 A1 | 5/2018 |

OTHER PUBLICATIONS

Grodensky, D., "Laser Ranging Using Incoherent Pulse Compression Techniques," Ph.D. Thesis submitted to the Senate of Bar-Ilan University, 2014 (119 pages).
Sun, X. et al., "Modified PN Code Laser Modulation Technique for Laser Measurements," Proc. of SPIE, vol. 7199, 71990P-1-71990P-8, 2009 (8 pages).
Deng, S. et al., "Very fast front end ASIC associated with multi-anode PMTs for a scintillating-fibre beam hodoscope," Topical Workshop on Electronics for Particle Physics, Sep. 17, 2012, IOP Publishing Ltd. for Sissa Medialab (9 pages).
Bashkansky, M. et al., "Phase-coded LiDAR," CLEO, 2002 (1 page).
Wu, L. et al., "Range Resolution Improvement of Range Gated Lidar System By Phase Coded Method," IEEE 2016, 6205-6208, 2016 (4 pages).
Fersch, T. et al., "A CDMA Modulation Technique for Automotive Time-of-Flight LiDAR Systems," IEEE Sensors Journal, vol. 17, No. 11, 3507-3516, Jun. 1, 2017 (10 pages).
Levanon, N., "Creating Sidelobe-Free Range Zone Around Detected Radar Target," IEEE 28th Convention of Electrical and Electronics Engineers in Israel, 2014 (5 pages).
Delaye, V. et al., "High-resolution eye safe time of flight laser range finding," Proceedings of SPIE, vol. 4035, 216-225, 2000 (10 pages).
Levanon, N. et al., "Non-coherent pulse compression—aperiodic and periodic waveforms," IET Radar, Sonar, and Navigation, vol. 10, No. 1, 216-224, 2016 (9 pages).
Nissinen, J. et al., "Integrated Receiver Including Both Receiver Channel and TDC for a Pulsed Time-of-Flight Laser Rangefinder With cm-Level Accuracy," IEEE Journal of Solid-State Circuits, vol. 44, No. 5, 1486-1497, May 2009 (12 pages).
Kurtti, S. et al., "Laser Radar Receiver Channel With Timing Detector Based on Front End Unipolar-to-Bipolar Pulse Shaping," IEEE Journal of Solid-State Circuits, vol. 44, No. 3, 835-847, Mar. 2009 (13 pages).
Palojärvi, P. et al., "A 250-MHz BiCMOS Receiver Channel With Leading Edge Timing Discriminator for a Pulsed Time-of-Flight Laser Rangefinder," IEEE Journal of Solid-State Circuits, vol. 40, No. 6, 1341-1349, Jun. 2005 (9 pages).
Deng, S. et al., "16-channel readout ASIC for a hodoscope," 17th IEEE International Conference on Electronics, Circuits and Systems, 33-36, 2010 (4 pages).
Arbel, N. et al., "Continuously Operating Laser Range Finder Based on Incoherent Pulse Compression: Noise Analysis and Experiment," IEEE Photonics Journal, vol. 8, No. 2, Apr. 1, 2016 (12 pages).

* cited by examiner

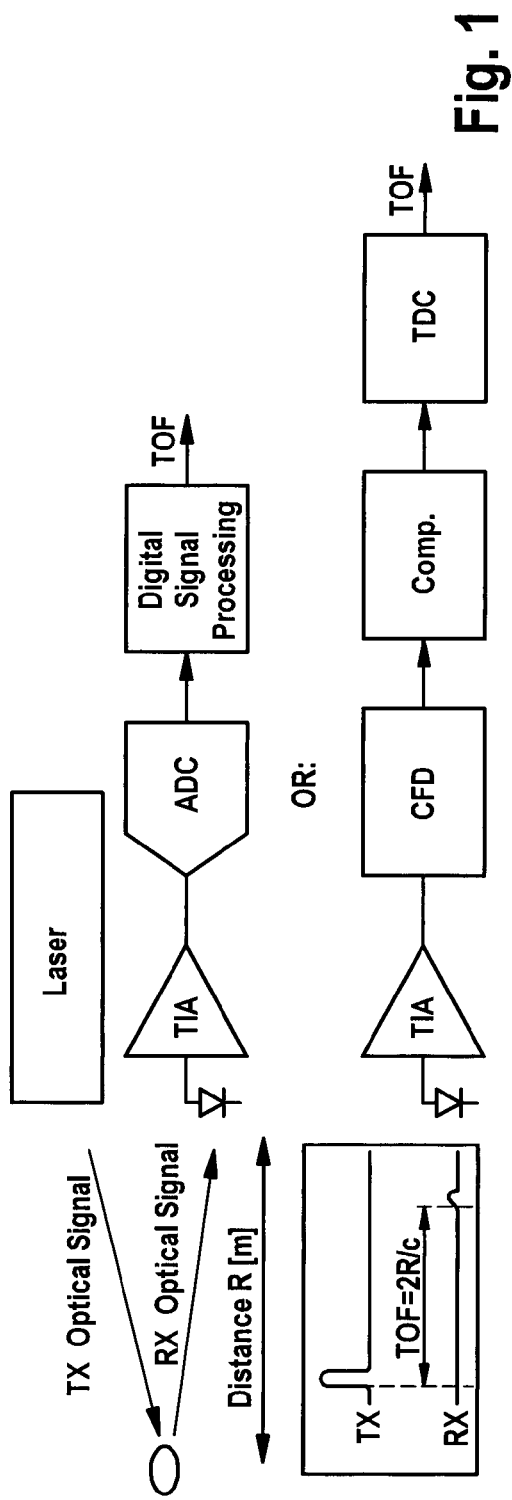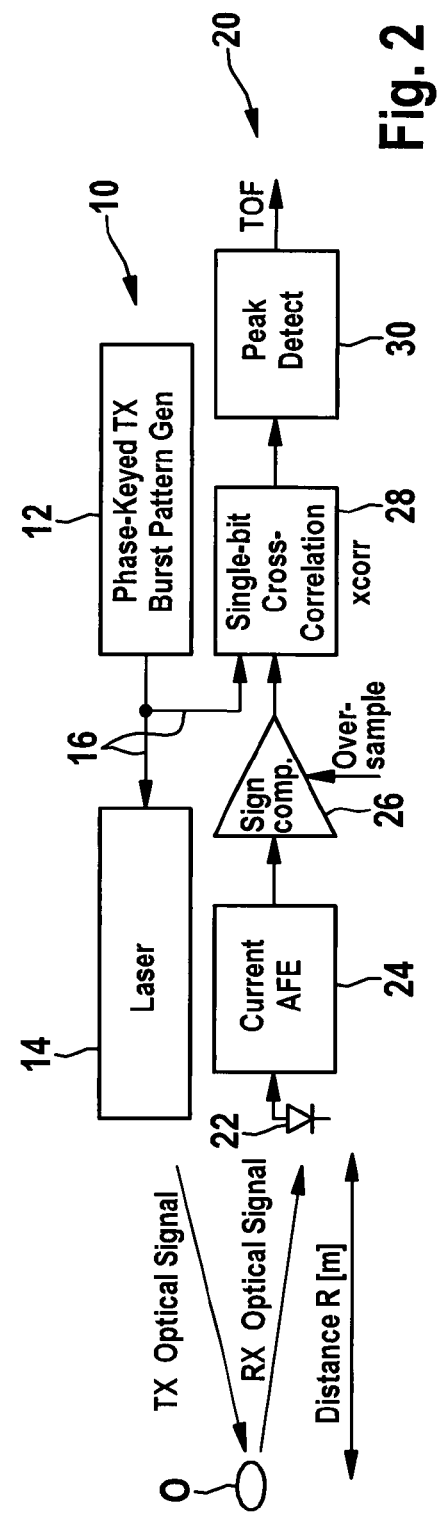
Fig. 1
Fig. 2

Example A
Single pulse x: narrow & high power
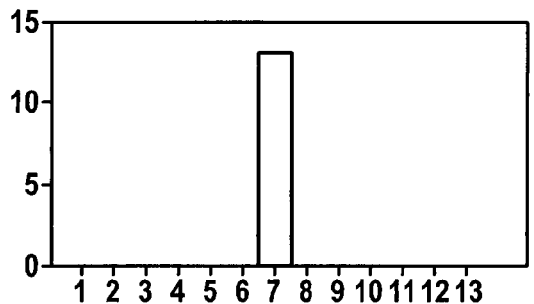
slew rate - cross-correlation with normalized key of x = 13
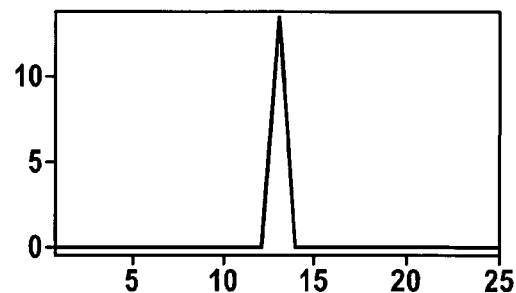
Example B
Single pulse y: wide & low power
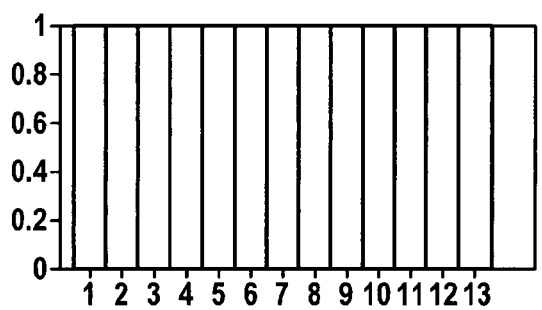
slew rate - cross-correlation with normalized key of y = 1
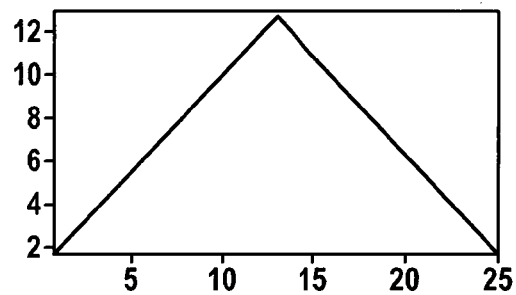
Example C
Barker code 13
slew rate - cross-correlation with normalized key of Barker = 10
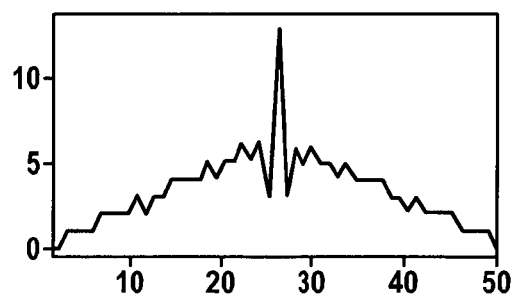
Fig. 4

Time domain TX burst | Correlation with Normalized TX key
single Pulse
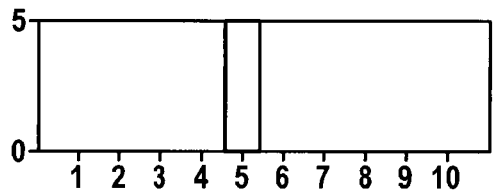 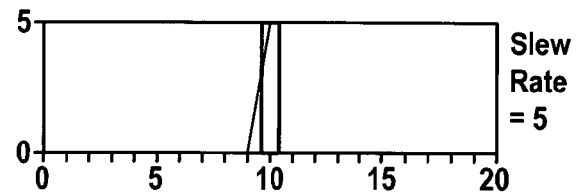
Barker 5
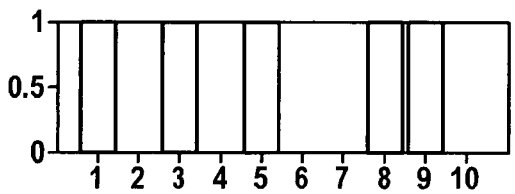 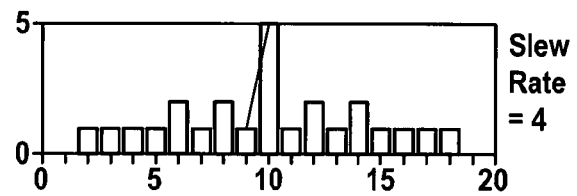
Sample 1
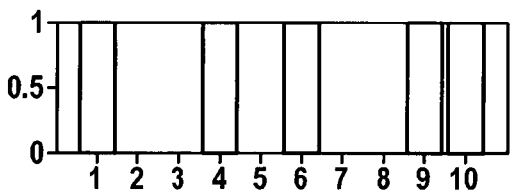 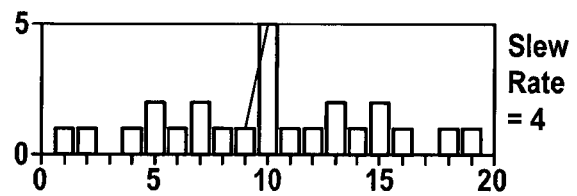
Sample 2
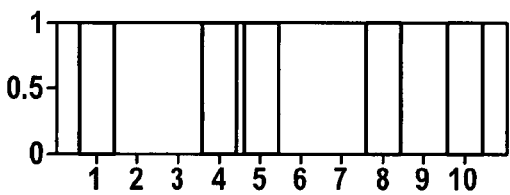 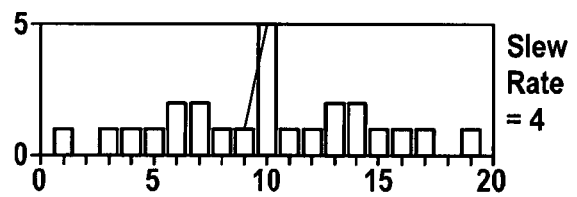
Sample 3
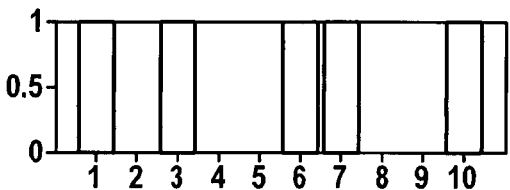 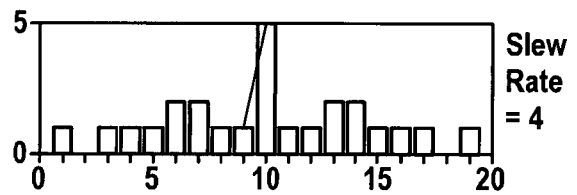
Sample 4
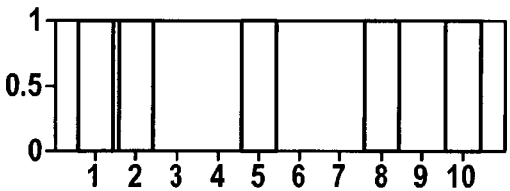 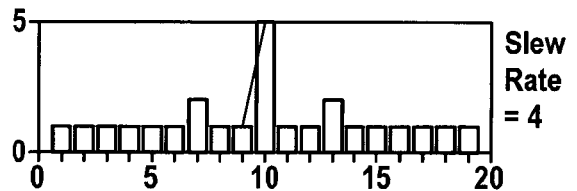
Fig. 5

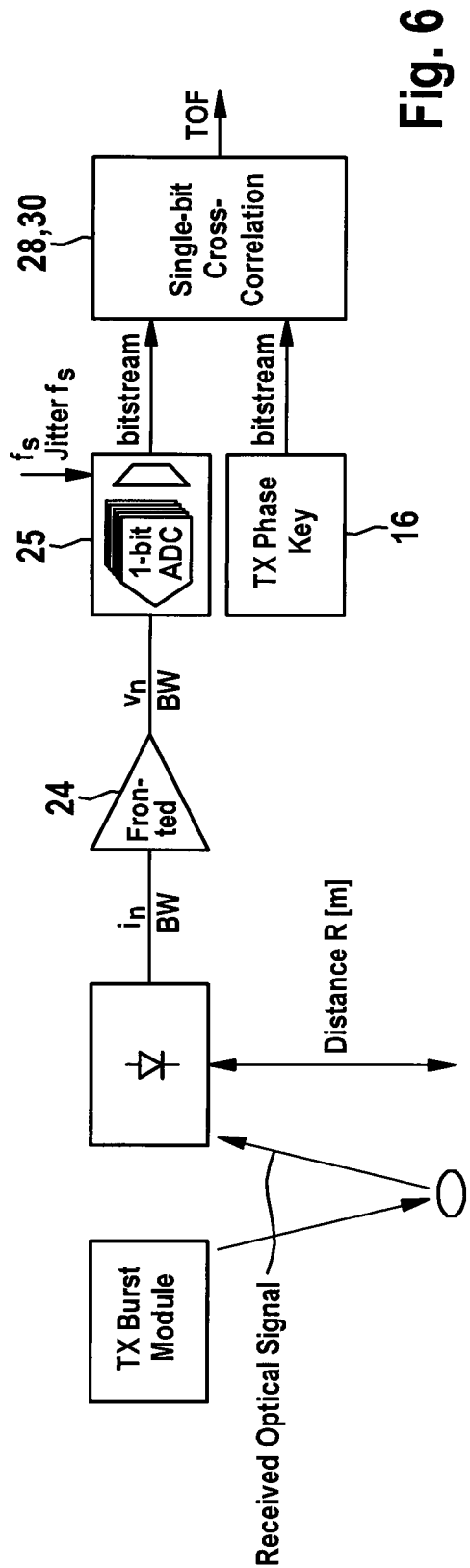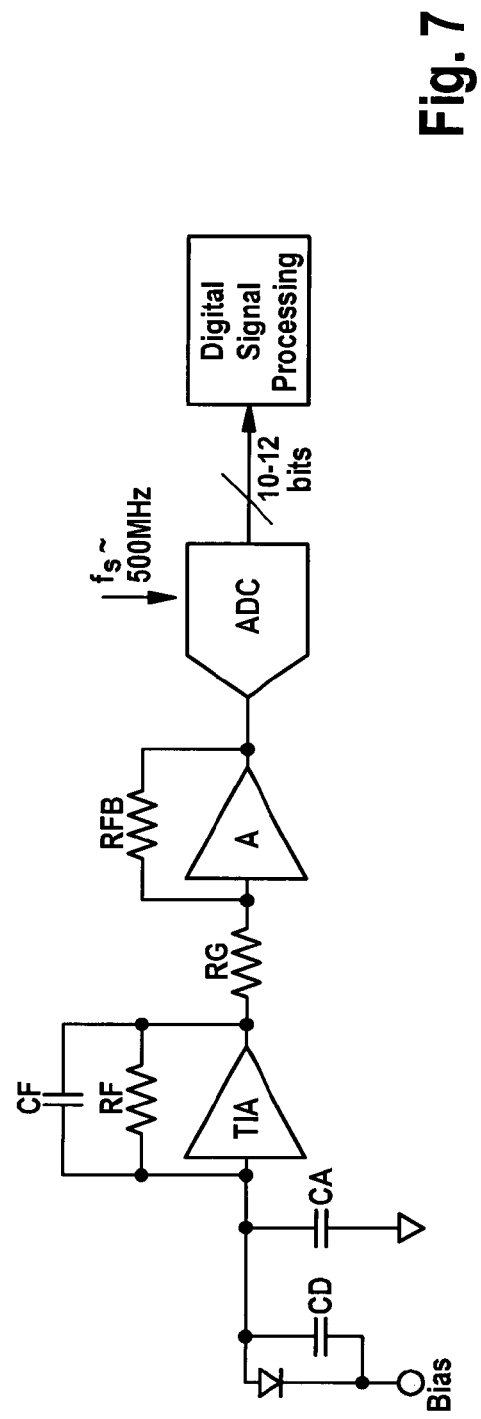

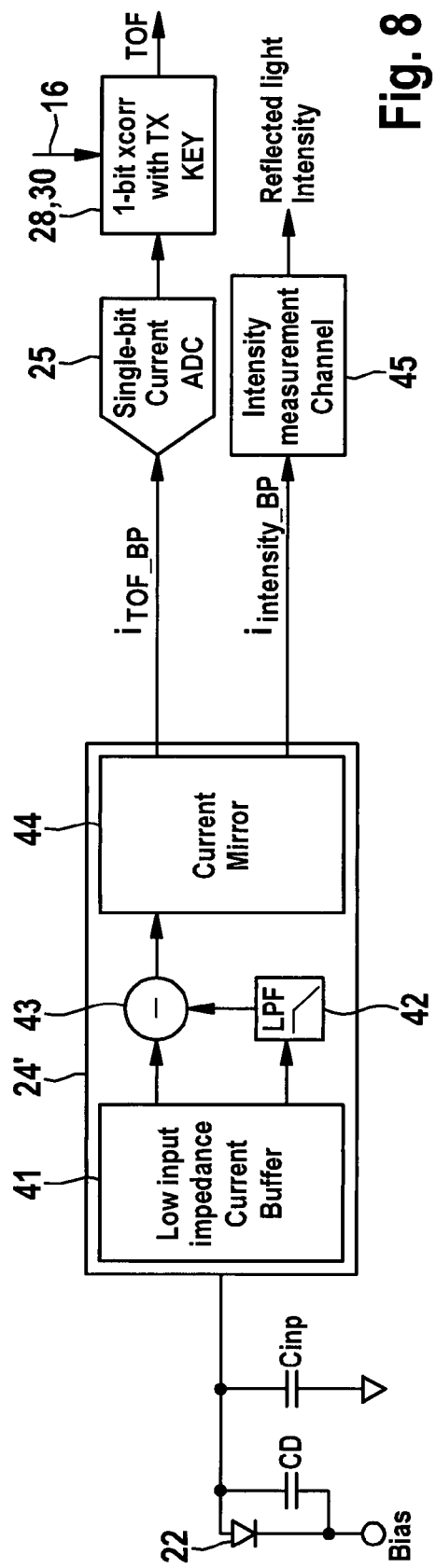
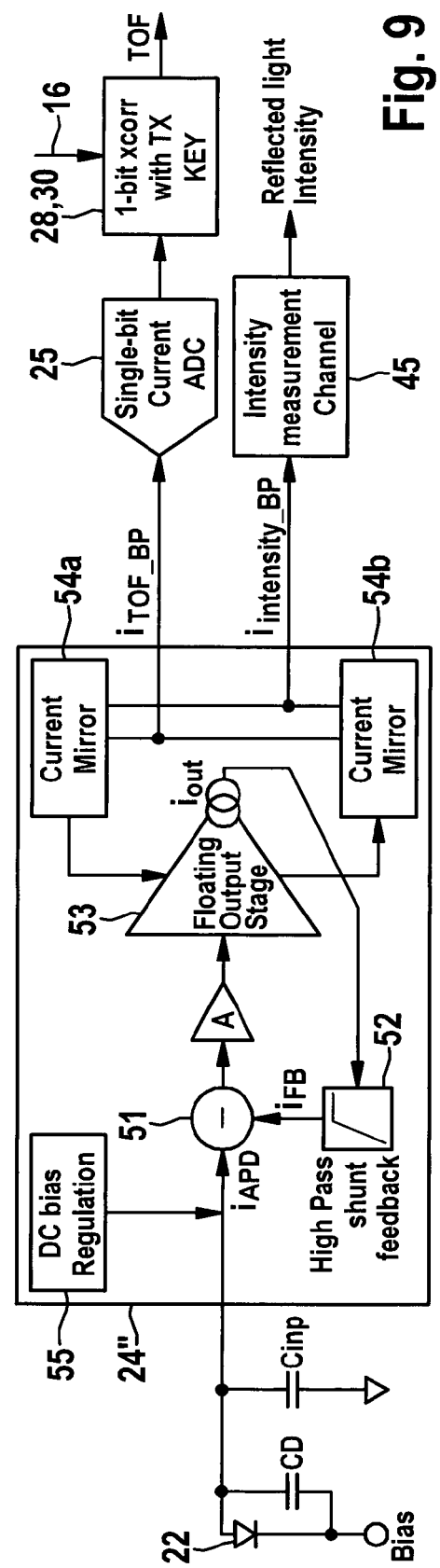
Fig. 8
Fig. 9

LIDAR TIME-OF-FLIGHT AND INTENSITY DETECTION SIGNAL-PATH BASED ON PHASE-CODED MULTI-PULSE TRANSMISSION AND SINGLE-BIT OVERSAMPLED MATCHED FILTER DETECTION

REFERENCE TO RELATED APPLICATION

This application is a 35 U.S.C. § 371 National Stage Application of PCT/EP2019/052094, filed on Jan. 29, 2019, which claims priority to U.S. Provisional Application Serial No. 62/624,185, filed on Jan. 31, 2018, the disclosures of which are incorporated herein by reference in their entirety.

BACKGROUND

The transmission and receive scheme of light detection and ranging (Lidar) systems have various categories, ranging from continuous-wave frequency or intensity modulated systems which measure range by means of phase or frequency measurements, to direct time-of-flight systems where the travel time of a transmitted laser pulse is measured. State-of-the-art long range automotive Lidars usually incorporate a direct time-of-flight single-pulse scheme, which is in line with eye safe operation of the laser requiring limitation on the transmitted laser energy.

Automotive Lidar systems with the long-range requirements (>200 meters) at low object reflectivity (~10 to 20%) need to be made eye-safe. The reflected optical signal's power is reduced quadratically by distance and linearly by the reflectivity of the object, which can easily translate to dynamic range in the order of 90 dB. To maximize range, the transmitted laser pulse needs to have very large peak optical power, on the order of many tens of watts. Eye-safe operation requires the average power to be maintained at the maximum permissible level by the standards, which requires the reduction of the pulse-width of the light signal to a few nano-seconds. This provides the best performance in terms of the achieved range, but imposes system challenges for the Lidar hardware implementation that contribute to cost and complexity. The driver of the laser light source needs to deliver a large amount of power to the laser in a very short time with fast switching time, usually requiring the development of special high-speed power semiconductor components, such as components using Gallium Nitride technology. Furthermore, the receive chain to measure time of flight (TOF) needs to deal with a large dynamic range imposed by the long distance and object reflectivity range.

With the current state-of-the-art, providing performance that meets the automotive Lidar specifications requires, on the one hand, a costly laser drive scheme imposing cost and potential introduction of electromagnetic interference (EMI) affecting the overall system performance and, on the other hand, high bandwidth and high dynamic range detector signal path. This in turn has translated to high speed front-end transimpedance amplifiers (TIAs) whose need for high bandwidth to condition the nano-second Lidar pulse negatively trades off with the noise performance, making them the noise performance limitation of the system. FIG. 1 depicts two typical RX schemes for current state-of-the art automotive Lidar systems. The single-pulse scheme has the received signal RX arrival information in only one pulse, which means a high speed (a few ×100's of MHz sample rate) but requires a high dynamic range (10~12 bits) analog-to-digital converter in order not to lose performance due to the induced quantization or aliasing errors. All of the above increase the cost and complexity of the overall Lidar system considerably. Furthermore, as the Lidar sensors become more popular in the vehicles in future, the single-pulse transmission scheme used for the direct TOF Lidar will be unable to cope with the interference issue arising because the single-pulse of one vehicle's Lidar cannot be distinguished from the Lidar single-pulse of neighboring vehicles.

SUMMARY OF THE DISCLOSURE

Combining the system-level trade-offs at the higher level, the complexities can be balanced out and the costly system component requirements reduced to enable low-cost and yet automotive-level performing Lidar systems. The Lidar systems of the present disclosure involve modifications to the optical design for the Lidar transmission scheme, as well as signal processing and analog-mixed mode integrated circuit design techniques. In one aspect of the disclosure, the transmit code of the TX optical signal embeds phase information and distributes the eye-safe energy level in the form of a burst of phase-keyed on-off laser pulses. The impulse response of the phase key can be chosen such that its auto-correlation function has a maximized slew-rate at peak or large suppression of the correlation side-lobes compared to the peak. This approach will improve the TOF detection accuracy at the backend.

In another aspect of the disclosure, the detection signal path (RX signal) involves high precision and high-speed analog and mixed-mode integrated circuit design techniques using a low-noise, high bandwidth, low-offset current-domain analog front-end of the signal path (bandpass filters, current amplifiers, etc.) as well as an oversampled current-domain single-bit ADC, followed by a bitstream domain cross-correlator, peak detection and TOF estimation. A parallel intensity measurement channel applies a copy of the photodetector output signal to a matched-filter based analog signal path followed by an analog-to-digital converter in order to determine the intensity of the incoming light RX. This introduces an analog cross-correlator followed by an ADC that digitizes the peak of the analog cross-correlation function, which is directly related to the intensity of the incoming light from the target.

As shown in the diagram of FIG. 1, the existing state-of-the-art direct TOF based Lidar schemes using linear detectors (e.g. avalanche photo-diodes (APD) or PIN diodes) make use of a high-power single transmit (TX) laser pulse and a high speed low noise trans-impedance amplifier (TIA) followed by high resolution ADC or a constant fractional discriminator (CFD), a comparator and a time-to-digital converter (TDC) in the receive (RX) path. In contrast, the Lidar systems disclosed herein transmit a phase-keyed burst of multiple pulses. The phase key is chosen such that the auto-correlation of the TX key impulse response has a sharp peak, i.e. a large slew-rate near the peak, and/or a maximal ratio between the correlation peak and the side-lobes.

In further contrast to the state-of-the art, the receive path of the present disclosure does not require amplitude detection for the RX signal in order to determine the TOF. As long as a time-domain sequence containing the sign of the RX signal can be cross-correlated with the TX key pattern, the time-of-flight (TOF) can be detected through peak detection of the cross-correlation function. This enables the use of a single-bit ADC or a sign comparator. The photodiode interface front-end circuit of the conventional current Lidar (see FIG. 1) is also replaced by a current-domain analog front-end (AFE) in order to break the trade-offs of bandwidth, noise and stability, inherent to the traditional transimpedance amplifiers (TIA). The current-domain front-end then enables very fast current domain comparators, which allows high oversampling ratios as such current domain 1-bit ADC can be sampled at much higher frequencies compared to the traditional multi-bit ADC's used in the state-of-the-art single-pulse Lidar systems.

DESCRIPTION OF THE FIGURES

FIG. 1 is a diagram of transmit and receive architecture implemented in conventional TOF Lidar system.

FIG. 2 is a diagram of transmit and receive architecture implemented by the Lidar systems according to the present disclosure.

FIG. 4 includes graphs of three examples of normalized TX transmission schemes with equal energy in normalized time (x-axis) and amplitude (y-axis) shown in the left column and their corresponding auto-correlation shown in the right column.

FIG. 5 includes graphs of a single pulse and five exemplary phase key coded bursts shown in the left column and their corresponding auto-correlation and slew rate shown in the right column.

FIG. 6 is a diagram of the receive architecture of FIG. 2 with a current-domain analog front-end (AFE) component shown in more detail.

FIG. 7 is diagram of a conventional TIA and ADC based Lidar RX signal path.

FIG. 8 is a diagram of a current-domain analog front-end (current AFE) for the receive RX signal path of the Lidar according to one embodiment of the present disclosure.

FIG. 9 is a diagram of a current-domain analog front-end (current AFE) for the receive RX signal path of the Lidar according to another embodiment of the present disclosure.

DETAILED DESCRIPTION

Figure 3A:
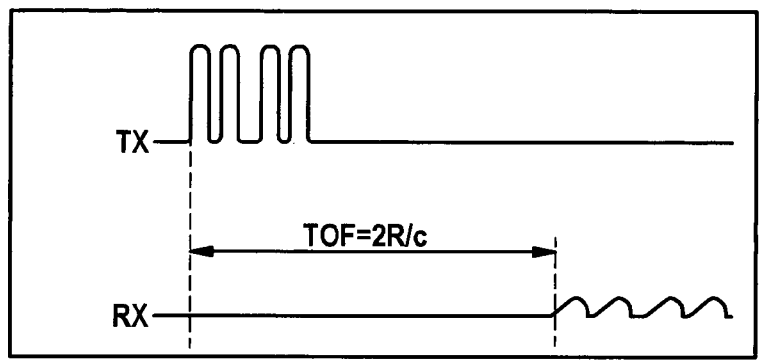
FIGS. 3a-3c are graphs of the optical signals, transmission key and reception sign and cross-correlation, respectively.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles disclosed herein as would normally occur to one skilled in the art to which this disclosure pertains.

According to one aspect of the disclosure, the signal path of the Lidar system distributes the eye-safe laser energy in time in the form of a burst of phase-keyed pulses, according to one system depicted in the diagram of FIG. 2. The transmit component 12 of a Lidar system 10 energizes a light source, such as laser 14, according to a burst pattern for the light signal TX shown in FIG. 3a. The burst pattern is generated by a transmission TX key control signal 16, as shown in FIG. 3b, to produce the series of on/off laser pulses at the fixed modulation period shown in FIG. 3a, in which the total of on-time followed by an off-time duration constitutes one period of modulation. The TX key control signal 16 is thus a single bit bitstream with a binary "1" corresponding to an on pulse and a binary "0" corresponding to the laser being off. The impulse response associated with this phase-keyed burst has a sharp auto-correlation function (high slew-rate near peak and/or high peak-to-side lobe ratio) similar to single pulse responses, as shown in the graphs of FIG. 4. In FIG. 4, three normalized TX schemes with equal energy in normalized time (x-axis) and amplitude (y-axis) are shown in the left column and their corresponding auto-correlation is shown in the right column. The top row, Example A, is a single pulse providing the largest possible auto-correlation slew rate. The middle row, Example B, is a reduced amplitude wide pulse (13× wider than top row but 13× smaller peak amplitude). This provides a degraded auto-correlation slew rate by the same scaling factor. The bottom row, Example C, is a phase-keyed pulse train using Barker 13 code, such as one type of phase-keyed pulse train considered for the Lidar of the present disclosure. The auto-correlation slew rate is held to a value close to the single pulse scheme (10 vs. 13 in the normalized scheme), while the peak time-domain amplitude of burst is 13× lower.

The phase coding disclosed herein retains the auto-correlation slew rate compared to the single pulse scheme, gaining back the TOF accuracy performance at the system back-end. One benefit is that instead of a single high power and narrow pulse as in Example A of FIG. 4, a burst of lower power phase-keyed pulses is transmitted, as in Example C, thereby maintaining a safe TX energy for eye-safety concern. The reduced laser peak power is also beneficial for simplifying the laser driver circuitry. For instance, instead of driving a 100 W peak power laser, the Lidar of the present disclosure can drive a less than 10 W laser 14 to generate the TX optical signal. This reduces system cost and complexity as well as the chance of electromagnetic interference (EMI).

Transmitting a phase coded burst by the Lidar's TX laser 14 enables specific receive path (RX) signal chain benefits. Since the transmitted information is in the phase-domain, the RX path no longer requires amplitude information in order to correlate the received Lidar signal with the transmit burst key. With no need for amplitude (since correlation is done with the normalized amplitude TX key control signal 16), the receive path of the receiver 20 can incorporate a sign detector that detects the sign of the RX signal at fixed time intervals. The receiver 20 can incorporate a conventional photodetector 22, such as a photodiode, with the output of the photodetector provided through a current-domain analog front-end AFE 24 to a sign comparator 26, as shown in FIG. 2.

The output of the comparator 26 over time can be cross-correlated 28 with the normalized TX key control signal 16 to determine the time-of-flight (TOF) by detecting the peak of the cross-correlation function output at peak detector 30. In the illustrated RX system, the sign comparator can be a single-bit comparator, which simplifies the system for TOF detection. In comparison, the state-of the art systems working with a single pulse require amplitude information to achieve the TOF accuracy required for automotive Lidar (>10 to 12 bits ADC's required). As shown in FIG. 2, the phase-keyed transmission of the present disclosure eliminates the state-of-the-art system's high dynamic range ADC and replaces it with a sign comparator.

Figure 3B:
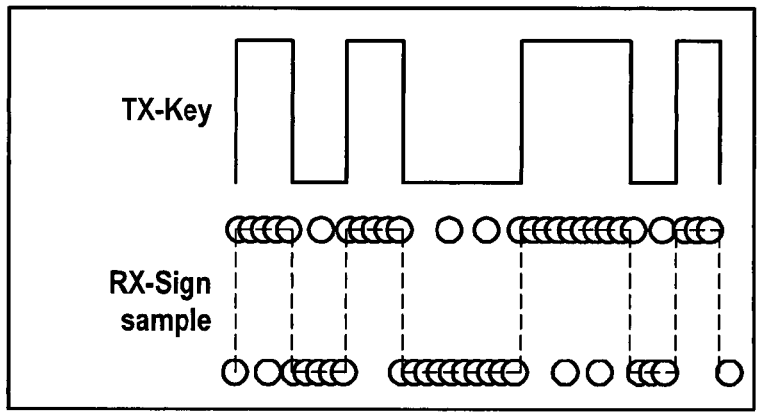
Figure 3C:
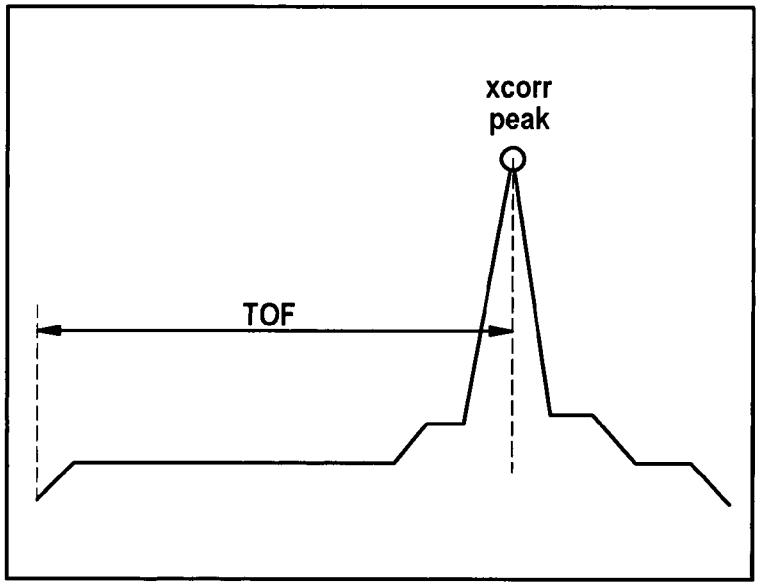

In the exemplary embodiment shown in FIGS. 2-3, the transmitted signal TX is received at the receiver 20 with a waveform delayed by the time-of-flight (TOF), as depicted in FIG. 3a. The comparator 26 receives the waveform and produces a bit stream output of binary "1"s when an RX signal is received and "0"s when no RX signal is received, as shown in FIG. 3b. This output and the TX key control signal 16 are provided to the single-bit cross-correlation circuit 28 to produce the cross-correlation output signal shown in FIG. 3c. It is this signal that is evaluated by the peak detector circuit 30 to find the cross-correlation peak identified in FIG. 3c. The time from the transmission of the TX light to the cross-correlation peak corresponds to the TOF and it is this time value that is output by the receiver circuit 20 to a Lidar processor, 3D image processor or other suitable device.

The combination of phase-keyed codes is not limited to the Barker code, but can include any phase-keyed combination that improves the slew rate of the auto-correlation function. The more pulses included in the TX burst, the more possible combinations of codes to satisfy the autocorrelation requirement for maximum peak slew-rate. The table in FIG. 5 shows examples of five-pulse burst TX signals in the left column, including a Barker 5 code and four codes other than the Barker code, and their corresponding auto-correlation slew-rate near the peak in the right column of FIG. 5 and its comparison with equal energy normalized single-pulse and equal pulse number burst of a Barker sequence have been shown in FIG. 5 for comparison. As reflected in the graphs, in the fixed TX energy regime of the disclosed embodiments, a normalized pulse-width single pulse TX with 5 units amplitude and one unit pulse-width has a correlation slew rate of 5. In other examples with the Barker 5 code and the four other sample codes, the slew rates of the correlation function near peak all come very close to the single pulse case, i.e. to a value of 4. It has been shown mathematically that all the code combinations that retain the correlation function's slew rate near the peak will provide a TOF accuracy very comparable to that of a system using a single pulse, but at a 5× lower peak amplitude averaged for 5 times.

For the five-pulse cases illustrated in FIG. 5 there are more than 10 combinations of phase keys that fulfill the desired correlation slew rate combination. With a greater number of pulses in the burst, the number of combinations can be increased. Thus, according to a further aspect of this disclosure, an automotive Lidar can randomly switch between a pool of such pre-selected, high slew-rate auto-correlation codes during TX-RX operation to minimize the risk of interference between neighboring vehicle Lidars while still benefiting from the system-level and performance benefits of the Lidar signal path scheme disclosed herein. The Lidar system can even switch randomly between possible combinations of bursts with different number of pulses and different phase keys that fulfill the correlation function slew rate maximization, thereby increasing the pool of possible phase-keyed codes.

In a further aspect of the Lidar systems disclosed herein, the existing state-of-the-art RX signal chain is replaced with the current-domain analog front-end 24, as shown in FIG. 2. The current AFE 24 can provide both speed and low-noise performance, avoiding the fixed gain-bandwidth product trade-off of a traditional trans-impedance amplifier (FIG. 1), where higher bandwidth combined with the detector's parallel parasitic capacitance requires a smaller feedback resistor that in turn causes more input referred current noise. Furthermore, the phase-keyed information can be extracted by means of a single-bit analog-to-digital converter (ADC) 25, as reflected in FIG. 6, in contrast with the existing systems where information is in the amplitude of the single-pulse transmitted by the Lidar. The single-bit ADC 25 is simpler, less expensive and easier to oversample (sample rates of a few GHz) in order to improve the resolution of the system, compared to a traditional multi-bit (10-12 bit) ADC (sampled at couple of hundred MHz) necessarily used in the prior Lidar systems.

As shown in FIG. 6, the RX signal path of the present disclosure implements the multi-pulse burst phase-keyed Lidar scheme and includes a current-domain analog front-end followed by a single-bit ADC (performing phase detection through sign detection) and various components of the signal path (such as avalanche photodiode (APD), sign detector, and cross-correlator in the bitstream domain). In contrast, the state-of-the-art single-pulse direct TOF Lidar systems using linear detectors (e.g. APDs) make use of transimpedance amplifiers (TIAs) and high dynamic range and high-speed ADC's, as shown in FIG. 7. This often involves amplifiers with multiple GHz of unity-gain-bandwidth at very low input referred voltage noise (few nV/√Hz), plus an additional second stage amplifier with close noise and bandwidth performance to that of the front-end TIA and a 10-12 bit ADC with sample rates in the order of ~500 MHz. A fundamental trade-off at the front-end of the system requires the bandwidth and the stability of the front-end TIA to be guaranteed for the specific prior art Lidar system, determined by the single pulse's pulse-width (determines bandwidth) and the detector's (and other component's) parasitic parallel capacitor. For the prior art devices this results in the choice of a small feedback resistor for the TIA (typical order of 1 kΩ to 4 kΩ, which can result in large input referred current noise density on the order of 20 to 10 pA/√Hz) or making the TIA the dominant noise source in the signal path (given the wide bandwidth of these systems (>250 MHz) and the small (<0.5 uA) detector signal for automotive range targets at say 200 m).

The RX signal path of the present disclosure replaces the TIA front-end of present state-of-the-art Lidar systems with a current-domain front-end, i.e. a current-input and current-output front-end, as represented by the exemplary systems shown in FIGS. 8 and 9. The received signal RX is typically buried under noise for long distance reflections (i.e. targets at 200 m). A DC offset is typically induced by back light causing a DC current in the detector circuitry. This DC current or noise should be suppressed before the signal is provided to the single-bit data converter 25. The DC current is mainly caused by the ambient light and it can be suppressed by designing the front-end to have a band-pass frequency response to accommodate the frequency content of the phase-keyed transmitted burst (band-pass region centered around the TX burst modulation frequency). Thus, in the embodiment of FIG. 8, the front-end 24' is essentially an open loop current-mirror based amplifier. The front-end 24' receives the output from the photodetector 22 through a low input impedance current buffer 41, with the output of the buffer fed to a low pass filter 42 operable to isolate the DC component of the photodetector output signal. This DC component is subtracted from the output of the current buffer 41 in a subtraction module 43 and this conditioned signal is fed to a current mirror 44 so that the output current from the subtraction module can be fed to both a TOF measurement channel and an intensity measurement channel that measures the charge produced by the photodetector as a function of reflected light. Thus, the current from the AFE 24' is supplied to the ADC 25, as discussed above, and to a module 45 for measuring the magnitude of the current, which is indicative of the intensity of the reflected light. The TOF and reflected light intensity signal can be supplied to a Lidar or 3D camera component as described above.

In the embodiment of FIG. 9, the modified front-end 24" is essentially a shunt feedback current mirror-based amplifier. The front-end 24" receives the output from the photodetector 22 a subtraction module 51, where a feedback current passing through a high pass filter 52 is subtracted from the incoming current signal. The output from the subtraction module passes through a floating output stage 53 driven by a pair of current mirrors 54a, 54b. A regulated DC bias may be applied by module 55. Current from the current mirrors is supplied to the ADC 25 and measurement component 45 to yield the TOF and intensity signals supplied to a Lidar or 3D camera as in the embodiment of FIG. 8.

The phase-keyed TX and RX scheme accomplished by the TX and RX circuitry disclosed herein utilizes a phase detector or sign comparator 26 (FIG. 2) to determine the sign of the RX signal in order to correlate with a normalized phase key control signal 16 of the TX signal. The sign comparator is, in principle, a single-bit ADC or a comparator. The current-domain analog front-end disclosed herein enables the use of a current-domain comparator, which is a decision-making circuit that receives a current as input signal, rather than a voltage, and produces a logic high or low as a function of the input current sign. Current-domain comparators can be made inherently faster than the voltage-domain counterparts, and can thus be oversampled at a higher rate than the state-of-the-art multi-bit (10 to 12 bit) ADC's sample rates. For instance, a state-of-the-art system with a 10 ns single-pulse TX and sampled at 400 MS/s has only 4 samples per pulse, while the proposed current-domain RX signal path incorporating a single-bit current-domain ADC can be sampled for instance at 4 GS/s.

Figure 10:
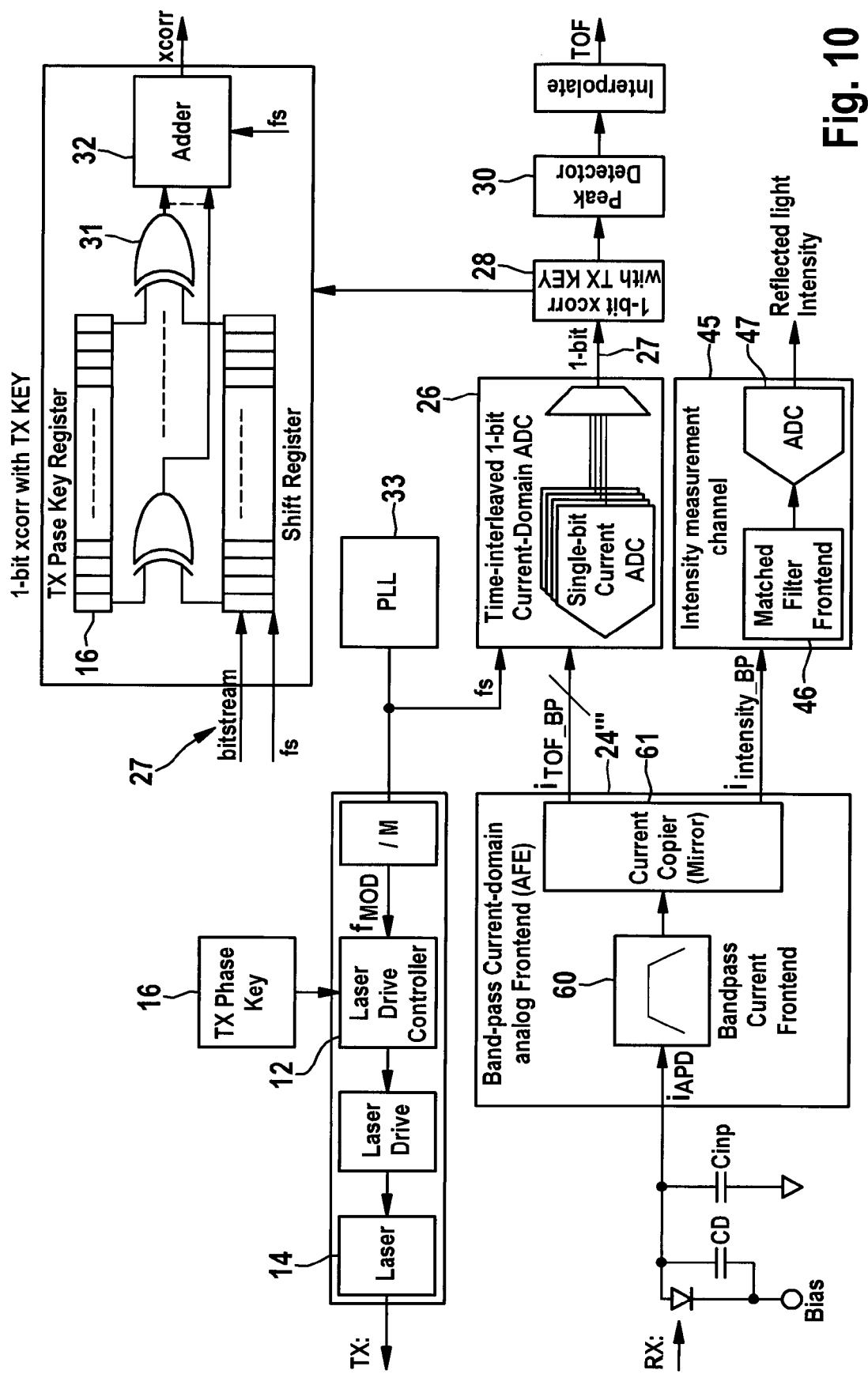
FIG. 10 is a diagram of a ten-pulse phase-keyed burst Lidar system according to one embodiment of the present disclosure.

By way of example, for a ten-pulse phase-keyed burst at 100 MHz modulation frequency, a system shown in FIG. 10 according to one embodiment of the present disclosure can have an oversampling ratio (OSR)=Sample-rate/(2×signal BW)~4 GHz/(2*(100 MHz/10))=200, while the state-of-the-art single-pulse system has an oversampling ratio of 400 MHz/(2*(1/10 ns))=2. This oversampling achieved by higher sample rate is enabled by a single-bit ADC and a noise-bandwidth limitation by the matched impulse response of the phase coded key applied to the ADC output through the cross-correlation operation in the backend of the signal path. This enables the achievement of ranges up to 200 m with minimum reflectivity of 20% with eye-safe laser TX burst when appropriate phase coding is used in the TX burst.

A further benefit of the single-bit operation is the implementation of the cross-correlation scheme in the bitstream domain, as illustrated in FIG. 10. In accordance with one feature of the present disclosure, the multiplication function in the "multiply+integrate" function of a conventional cross-correlator can be replaced with a simple XOR logic gate 31 whose output is then applied to an adder 32 that implements the integration function. This greatly simplifies the digital back-end hardware that operates at high oversampling ratio of the current-domain single-bit front-end as digital multipliers are more expensive than adders in order to implement. The XOR logic gate 31 receives the TX phase key control signal 16 in one register and the bitstream 27 from the sign comparator 26 into a shift register. A clock signal $f_s$ generated by a PLL module 33 controls the timing of the sign comparator, laser drive controller 12, XOR logic gate 31 and adder 32. As shown in FIG. 10, the current domain front-end 24''' can be modified from the front-end 24' in FIG. 8 to incorporate a band pass filter 60 and current mirror 61.

The system architecture disclosed herein takes advantage of embedding signal processing techniques in the Lidar transceiver signal chain, as demonstrated in the diagram of FIG. 10. The ranging signal path relies on the TOF measurement to measure the distance to the target. The reflected light intensity is another measurement of interest that can be used by the overall system processing the Lidar sensor data to classify the target object. The reflectivity of the object can be extracted from the reflected light intensity and TOF information. Hence a signal path dedicated to the measurement of the intensity of the reflected light can work in parallel with the TOF signal path. Simultaneous measurement of the intensity, together with TOF is enabled by copying the signal current of the same detector by using the current mirrors 44, 54a, 54b, 61, as shown in FIGS. 8-10. In each systems of FIGS. 8-10, the copy of the signal made by the analog current-domain front-end 24', 24", 24''' is fed to an intensity measurement signal path as represented by the measurement module 45. This signal chain produces a digital number proportional to the intensity of the laser light reflected back from the target.

Figure 11:
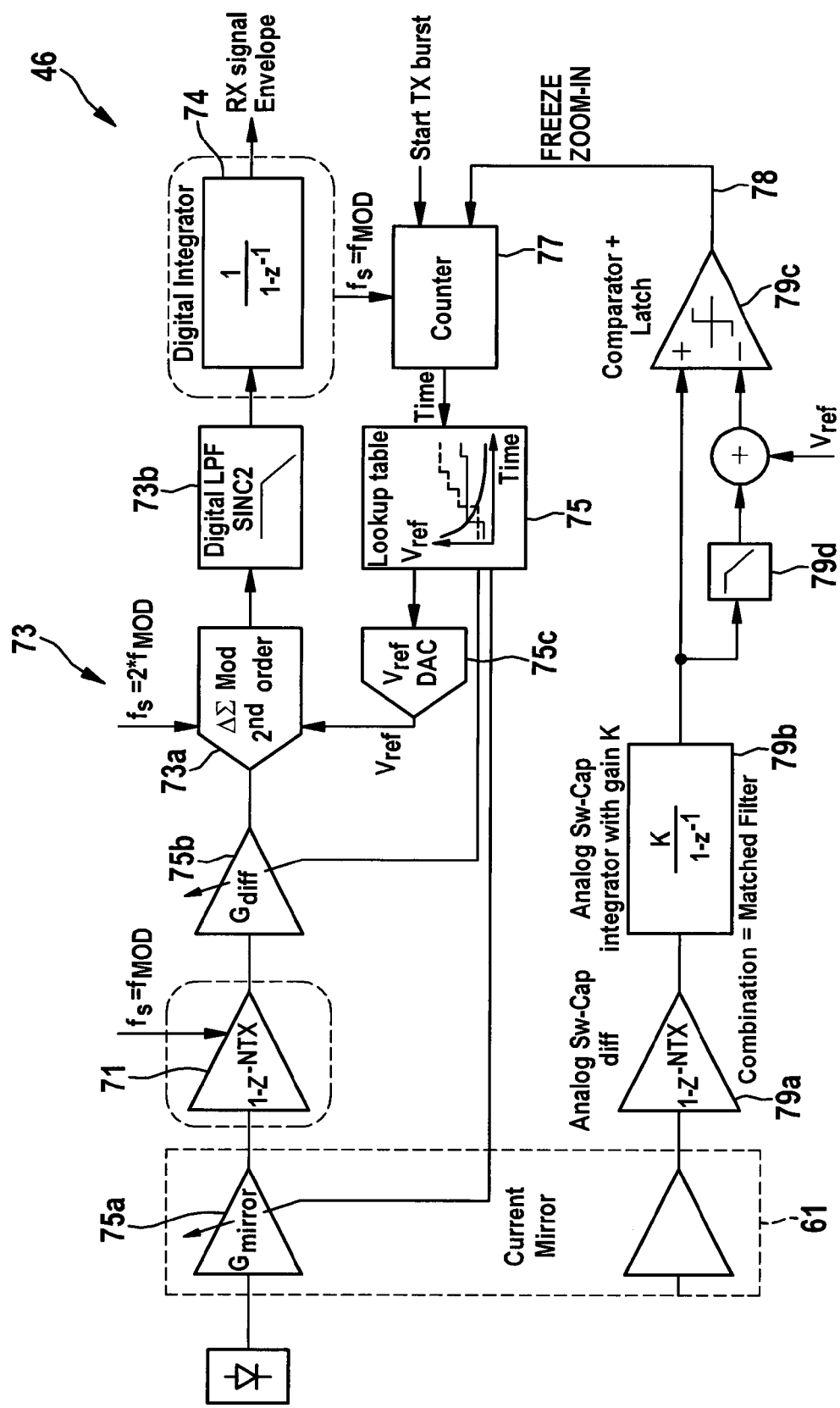
FIG. 11 is a diagram of a matched front-end filter for an intensity measurement module according to one embodiment of the present disclosure, for use with the RX signal path systems in FIGS. 8-10.
Figure 12:
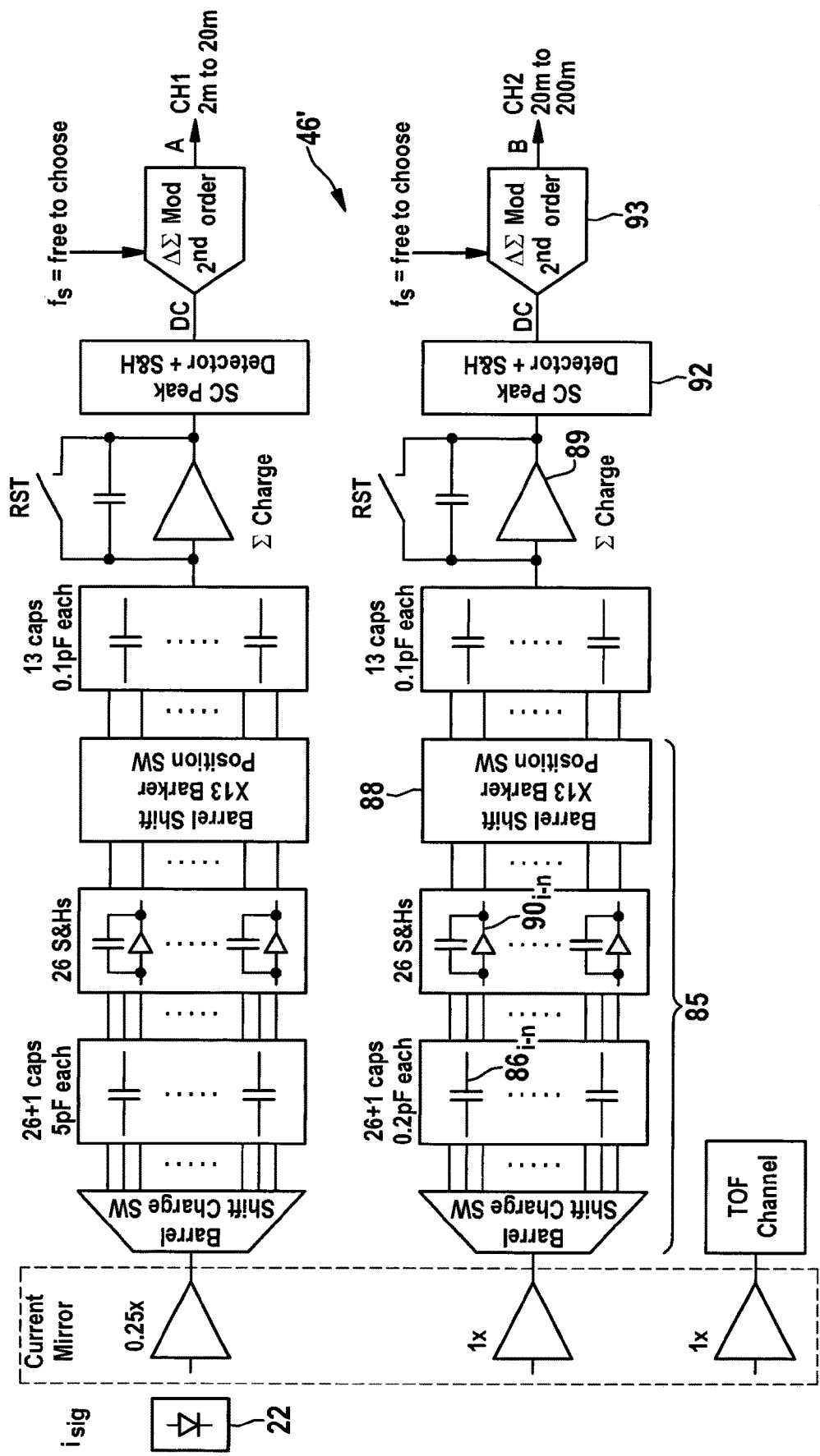
FIG. 12 is a diagram of an analog cross-correlator for an intensity measurement module according to one embodiment of the present disclosure, for use with the RX signal path systems in FIGS. 8-10.

The present disclosure contemplates two architectures for the measurement module 45 for the intensity signal path, as shown in FIGS. 11 and 12. Both architectures take into account the impulse response of the transmitted phase-keyed TX burst and apply an analog matched filter to the arrival signal and analog-to-digital conversion to digitize the intensity information. The matched filter front-end helps extract the signal from noise, especially for long distance measurements when the reflected receive signal is buried under noise. One challenge is keeping the dynamic range of the RX signal path to ~90 dB. Dynamic range is a function of distance (~5000×) & reflectivity (~10×). Addressing this challenge requires an ADC with BW=10's of MHz and DR=90 dB that is low cost and simple to implement. The latter is relatively challenging and costly to implement. In order to address this challenge, the two architectures for the measurement module 45 disclosed herein rely on knowing the phase key code that has been transmitted and on an analog front-end with a matched filtering function embedded in it to extract the magnitude of the RX signal. This results in a more relaxed specification for the ADC.

The architecture shown in FIG. 11 embodies a more hardware efficient solution that is less robust for long distances (>150 m). The second architecture shown in FIG. 12 is a slightly less hardware efficient solution that provides a more robust signal path that can operate to distances of 200 m and beyond.

The architecture for the measurement module 45 shown in FIG. 11 contemplates a progressive zoom-in signal path. A factor of ~×5000 of the signal dynamic range is due to distance. The module 45 zooms the gain of the signal path as a function of time to map the potential arrival reflection to the dynamic range of a lower dynamic range ADC (40 to 45 dB in contrast to 85-90 dB) optimized for the reflectivity range (e.g. ×10 as reflectivity changes from 10% to 100%). Zoom-in progresses as a function of time from the moment the TX laser burst fires. An arrival detection path monitors whether the signal has arrived or not. As long as the signal has not arrived the signal path's forward gain (the front-end current mirror gain, the ADC's reference voltage, etc.) increases at given points in time corresponding to given predetermined distance points. These distances can be spaced to fit the logarithmic scaling of the reflected optical signal amplitude as a function of distance (scales with reciprocal of the square of the distance). The logarithmic nature of dynamic range allows for the adoption of only a few points, e.g. only 4 to 5 points, stored in a look up table that stores the gain settings for given time periods associated with the given distance points.

The measurement module 45 incorporates a rectangular impulse response analog filter 46 and an ADC 47 (FIG. 10). The rectangular impulse response (also called a SINC filter) can be implemented as a cascade of a differentiator 71 and an integrator 74 embedded in the signal path, which increases the module's selectivity to extract the intensity signal for long distances where the RX signal is buried under noise. The analog differentiator 71 produces the difference between the samples of the input signal that are separated in time by the time-domain width of the rectangular filter impulse response. The width of the filter is matched to the width of the TX pulse burst, i.e. the number of pulses (NTX as shown in FIG. 11) multiplied by the modulation period. Progressive zoom-in can be applied to the differentiator gain and the integrator gain, as well as to the ADC gain in a time-progressive manner, as discussed below.

In filter 46, the output of the integrator 74 will clip for near range Lidar signals that are a 1000-2000× larger than those of the far range (FIG. 11). If the system is scaled for near range signals, the far range signals will not be detectable due to noise. To solve this problem, the filter 46 is constructed such that an ADC 73 is placed in between the analog differentiator 71 and digital integrator 74, which is configured as a digital integrator. The ADC 73 digitizes the output of differentiator 71, which can be designed not to clip and the digital integrator 74 is configured (by allowing sufficient word length) not to clip. The result is a hybrid analog/digital matched filter front-end 46 with digitization embedded in it to digitize the intensity of the reflected signal while its gain zooms-in until the reflection arrives, hence, it can still utilize a low dynamic range (and less complex) ADC. The hybrid front-end 46 thus eliminates the need for the ADC 47 since an ADC is embedded within the front-end circuit.

The differentiator 71 can be a switched capacitor circuit operating at a sample-and-hold frequency synchronous to the modulation frequency of the TX clock. For instance, in the case of a 10-pulse TX burst and a modulation frequency of 100 MHz, 10+1 capacitors are used, with each charging up once every $1/100$ MHz seconds (10 ns). One capacitor constantly charges and resets per clock phase. The other ten capacitors act as memory, i.e. sequentially get charged and their charge maintained until used at ten clock phases later. At any given moment, the charge difference between the currently charged capacitor and the capacitor that was charged ten clock periods ago gets subtracted, as indicated by the discrete-time z-domain transfer function in FIG. 11, namely: $1-Z^{-NTX}$, where NTX is the number of TX pulses and the discrete time sample frequency is equal to the TX modulation frequency. The output of the differentiator is passed to the ADC 73, which can be a sigma delta modulator 73a followed by a SINC low pass filter 73b (LPF) to remove its high frequency up-modulated quantization noise, although any other ADC is contemplated that fulfills the sample rate, dynamic range and resolution requirements. The integrator 74 of the rectangular filter is implemented in the digital domain by the $1/(1-Z^{-1})$ discrete time z-domain transfer function. A lookup table 75 at four or five points— e.g. at time instances corresponding to distances of 2 m, 5 m, 20 m, 50 m, 100 m—scales the current front-end gain 75a and/or differentiator gain 75b and/or the ADC reference 75c. The lookup table is driven by a counter, running at the modulation frequency ($f_{MOD}$) of the TX burst and starting from zero initial condition when the laser TX burst is fired.

The filter 46 receives the starting TX burst at counter 77 which commences the timing sequence for the lookup table 75. The front-end filter 46 can incorporate a freeze component 78 as shown in FIG. 11 that has the function of determining that the reflection has arrived to freeze the progressive zoom-in function executed by the lookup table 75. This freeze stops the intensity measurement channel from saturation if the distance of the target to the Lidar is such that part of the receive burst signal occurs before a progressive zoom moment governed by the look-up table and part of it occurring after this moment (this will saturate the signal path). This is done by freezing the counter 77 that initiates the operation of the lookup table 75. The arrival detection path is a fully analog rectangular filter with a differentiator 79a that is the same type of switched capacitor differentiator described above followed by an analog integrator 79b (switched capacitor) with gain followed by a comparator 79c with a set threshold added to a low pass filtered 79d signal filtering the integrator output (this forms a high pass frequency response for the comparator to reject accumulated low frequency noise at the output of the integrator 79b). The comparator 79c triggers when the integrator output (rectangular filter output) grows beyond the noise floor. This integrator clipping due to large signals is not a problem as its function is to detect the arrival of the signal. The comparator reference point is such that it guarantees triggering for large distances (small amplitude) signals, which can be achieved by setting the threshold level and high pass corner frequency based on the expected noise at the output of the front-end matched filter. When the comparator 79c triggers the counter 77 is frozen, creating the progressive zoom-in function.

Figure 13:
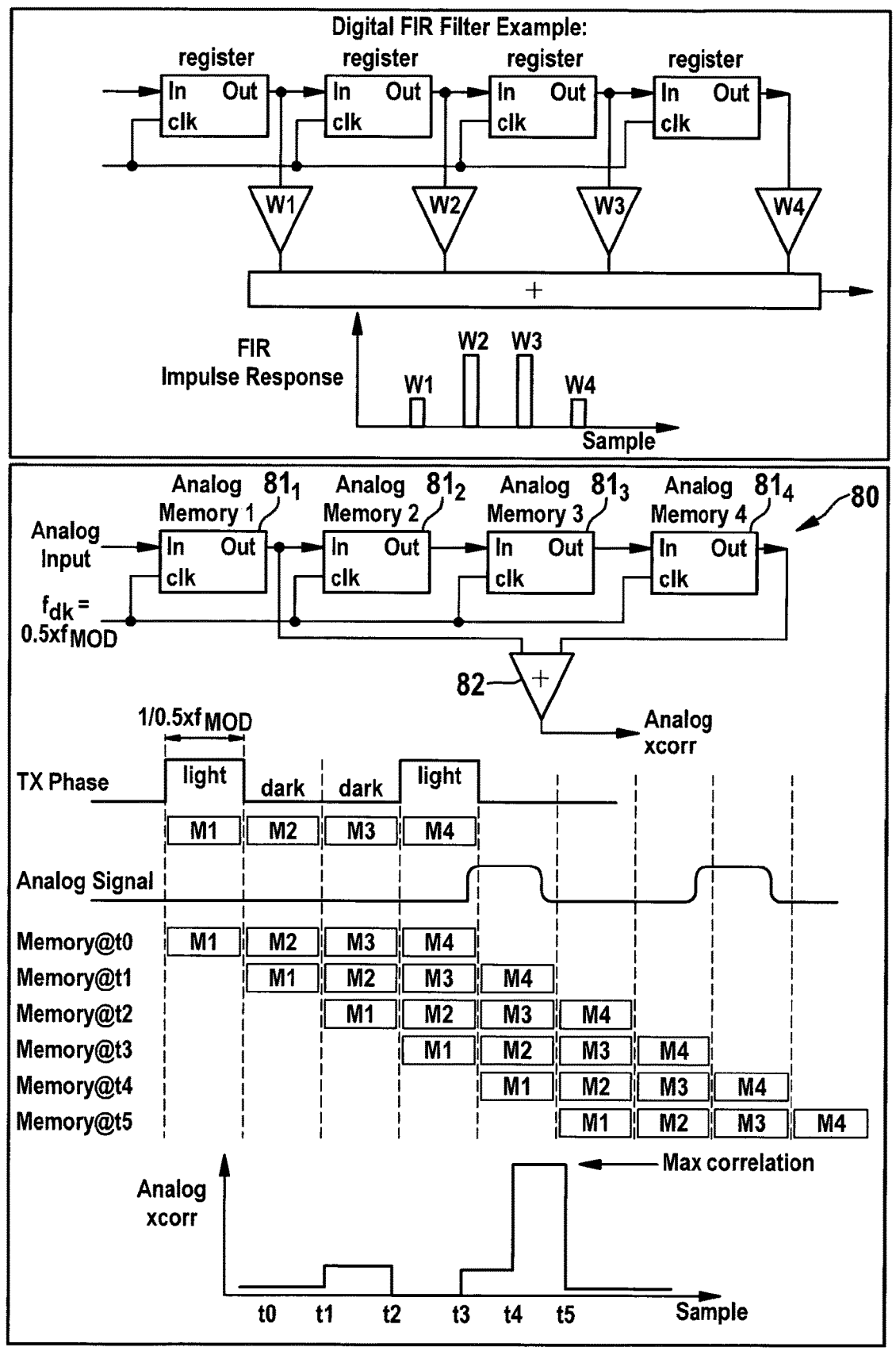
FIG. 13 shows a comparison between a digital FIR filter on the left side of the figure and the analog cross-correlator for the module shown in FIG. 12 on the right side.

The intensity measurement channel shown in FIG. 12 does not use a rectangular impulse response matched filter as in the front-end architecture in FIG. 11. Instead the front-end 46' of FIG. 12 implements a scheme where the exact phase-keyed impulse response used in the TX burst of the Lidar is applied to the analog RX signal, in the manner of an analog cross-correlator. This distinction can be understood in considering a digital FIR filter that sends a stream of digital data to a digital shift register synchronous to clock. At every tick of the clock the data gets shifted through the shift register by one tap of the shift register. At every clock phase the shift register values get multiplied by the FIR impulse response weights whose outputs are summed to form the FIR filter output, as depicted in the left diagram in FIG. 13. The front-end 46' contemplates an analog cross-correlator that incorporates an analog shift register 80 whose taps are implemented by analog memories, as shown in the right side of FIG. 13. At ticks of a clock running at two times the modulation frequency of the TX burst, a new analog signal value enters the analog shift register 80 and the contents of the register is passed through the memory elements $81_1$-$81_4$ by one tap of the shift register. Knowing the half modulation period indexes where the TX laser was on (i.e., producing light), at each tick of the clock the signal can be summed using a summing amplifier 82, at the analog memory elements $81_1$-$81_4$ of the analog shift register that correspond to clock phases that are supposed to have light. This sum corresponds to the output of the cross-correlation function in analog domain. When the return RX signal is completely aligned with the TX key, the summing amplifier output will peak. The example in FIG. 13 shows a simplified case for a TX burst with light present in the first and fourth half modulation periods, and darkness for the second and third. The summing amplifier adds the analog memory outputs at elements 81a and 81d. For the illustrated case, the output of the summing amplifier 82 peaks after shifting the analog information through the register four times at the illustrated time stamp t4.

Figure 14:
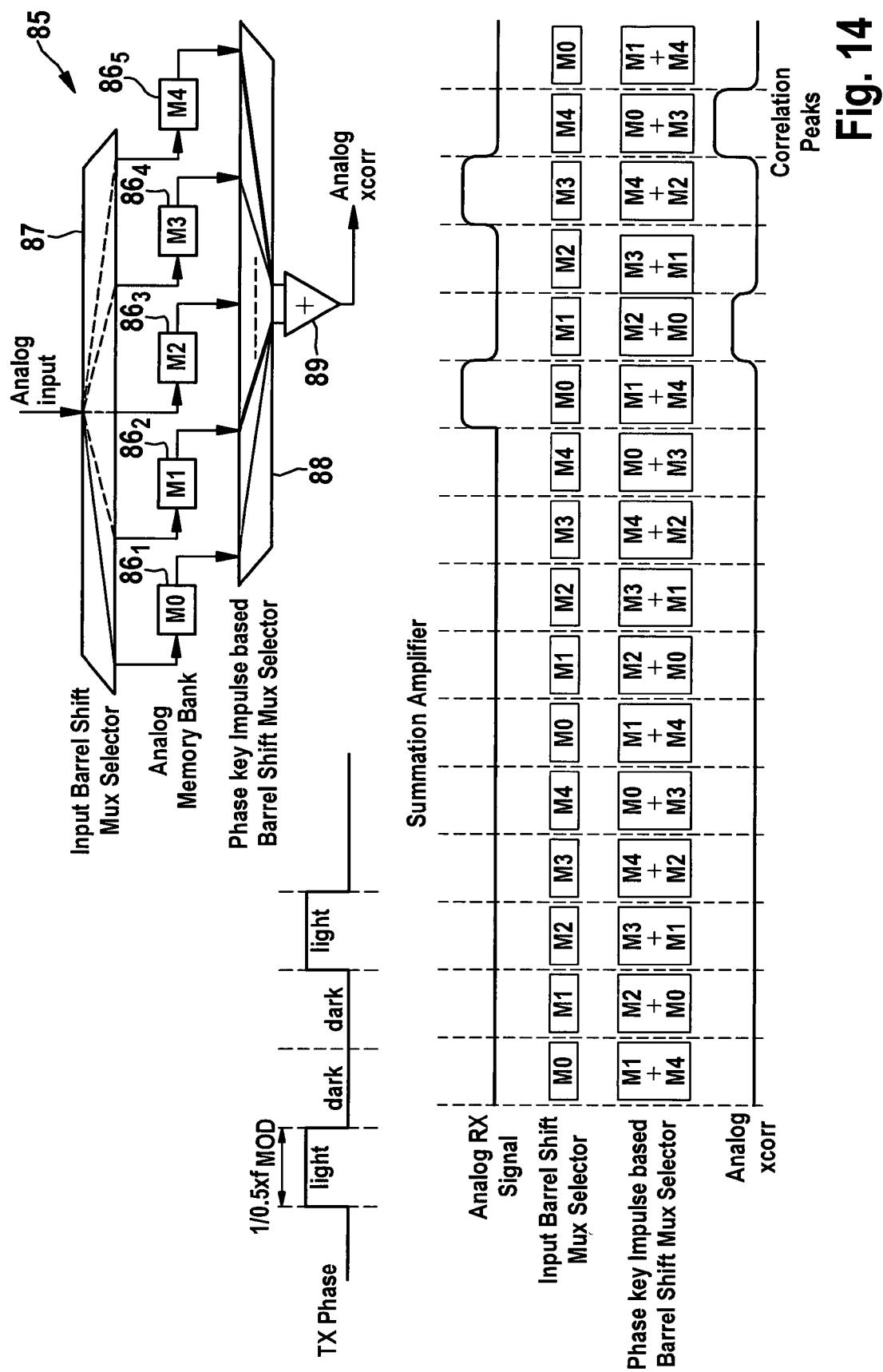
FIG. 14 is a diagram of an analog memory shift register for use in the intensity measurement module shown in FIG. 12.

Each analog memory element $81_1$-$81_4$ can be a capacitor charged with the output current of the photodetector 22 (FIG. 12) for periods of time equal to half modulation frequency. The summing amplifier 82 then produces an output value corresponding to the analog memory locations (capacitor charged values) that correspond to the TX phases where light is expected. One potential detriment is that transferring charge from one capacitor to a neighboring memory capacitor to implement an analog shift register can degrade the charge signal due to noise (switch noise capture by the cap in the form of KT/C noise) as well as other errors, such as switch charge injection, leakage and clock feed-through. In order to avoid these potential problems, the systems disclosed herein implement an analog memory shift register 85 that includes an input to form a barrel shifter multiplexer selector 87, as shown in FIG. 14, that selects which analog memory element $86_1$-$86_5$ should be charged by input current of the photodetector 22 at any discrete sample moment (with the sample frequency at rate of half modulation period of TX burst). A second barrel-shifter selector 88 is provided at the output of the memory elements $86_1$-$86_5$ that selects on a rotational basis a number of memory elements whose charge instances should correspond to the phase instances of the TX burst impulse response where light was expected. This kind of selector at input and output behaves as a barrel shifter where instead of shifting the analog signal in the memory elements like the shift register of a digital FIR filter (FIG. 13), the pointer is shifted that is looking at the memory element that needs to be charged at each instance of time and the memory elements whose value should contribute to the summation, as depicted in FIG. 14. The memory bank is filled up with consecutive phases of input signal and once it is filled up, the oldest memory element becomes available to be filled up with new analog input signal and the barrel shifter keeps going around the memory bank to refresh the memory elements with input signal. One extra memory element than the number of half phases in the TX burst key is needed so that at any instant of time when one memory is being refreshed, the full number of phases of the TX key can be stored in the remaining memory elements.

The second barrel shifter selector 88 connects the appropriate memory element outputs to the summation amplifier 89. The analog memory shift register 85 in FIG. 14 is looking at two half cycle phases of the TX key at any time. Given the rotary nature of memory refresh, the output selector also updates its pointers at every clock cycle to always look at two memory elements whose values correspond to the instances in history that correctly correspond to the desired phases of the TX key.

The front-end 46' shown in FIG. 12 further contemplates an analog correlator-based intensity channel with signal chain closer to implementation. By way of example, a thirteen-pulse code TX needs 1+2×13=27 capacitors as memory elements $86_{1-n}$ in the form of the barrel shifter multiplexer selector shift register 85 shown FIG. 14. The switched-capacitor circuit of the front-end 46' integrates half periods of TX modulation by sampling the current mirror output current through charging the front-end capacitors. An equal number of sample-and-hold buffer amplifiers $90_{1-n}$ maintain the memory capacitor charges for consecutive charge summation operations. The second barrel shift multiplexer switch network 88 connects the output of the appropriate input memories (sample-and-hold amplifiers $90_{1-n}$) to the charge summing amplifier 89. The charge summing amplifier 89 is then followed by a peak detector 92 that holds the analog value of the peak of the cross-correlator, which is then digitized by an ADC 93. The ADC 93 digitizes the DC output of the peak detector 92, hence relaxed design requirements for the ADC in terms of resolution, conversion time and bandwidth of operation.

The front-end 46' can have two parallel paths A and B whose input ranges are scaled logarithmically. One path A can be set for reflection signals RX from targets located from 2 m to 20 m and the other path B for targets located from 20 m to 200 m. Both paths operate simultaneously at each conversion. Depending on range (which can then be determined from the TOF information from the TOF measurement channel), one channel might saturate (too large signal), or might not be able to resolve the intensity (too small signal).

Figure 15:
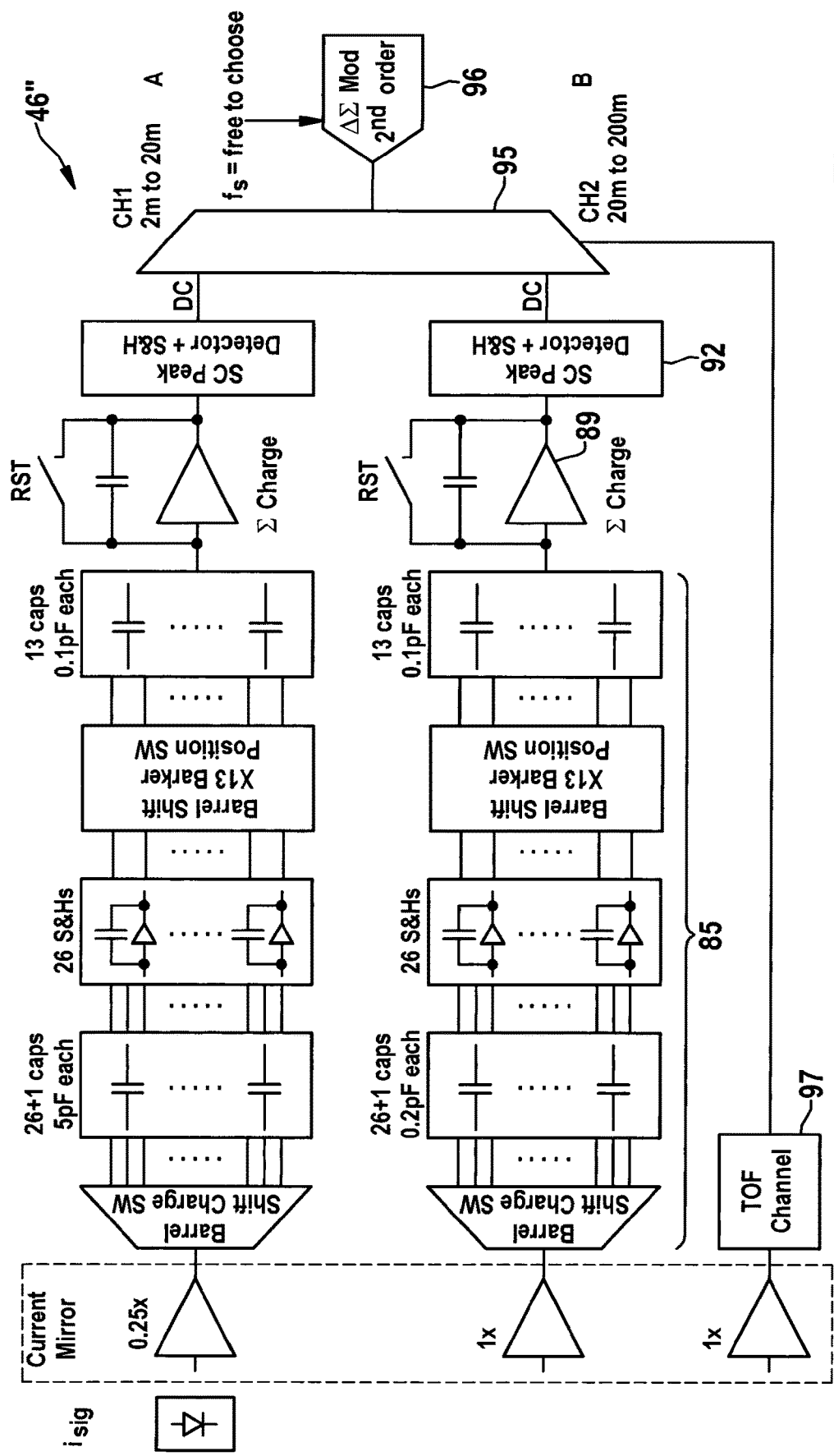
FIG. 15 is a diagram of another analog cross-correlator for an intensity measurement module according to one embodiment of the present disclosure, for use with the RX signal path systems in FIGS. 8-10.

As an alternative to the front-end 46' described above, the front-end 46" shown in FIG. 15 uses only one ADC converter 96 by multiplexing the output of the switched capacitor peak detectors in paths A, B through a multiplexer 95. The multiplexer 95 receives the time-of-flight (TOF) signal from the TOF channel 97 (see FIGS. 8-10) and is configured to select which analog signal (path A or B) to digitize based on the output of the TOF channel.

Figure 16:
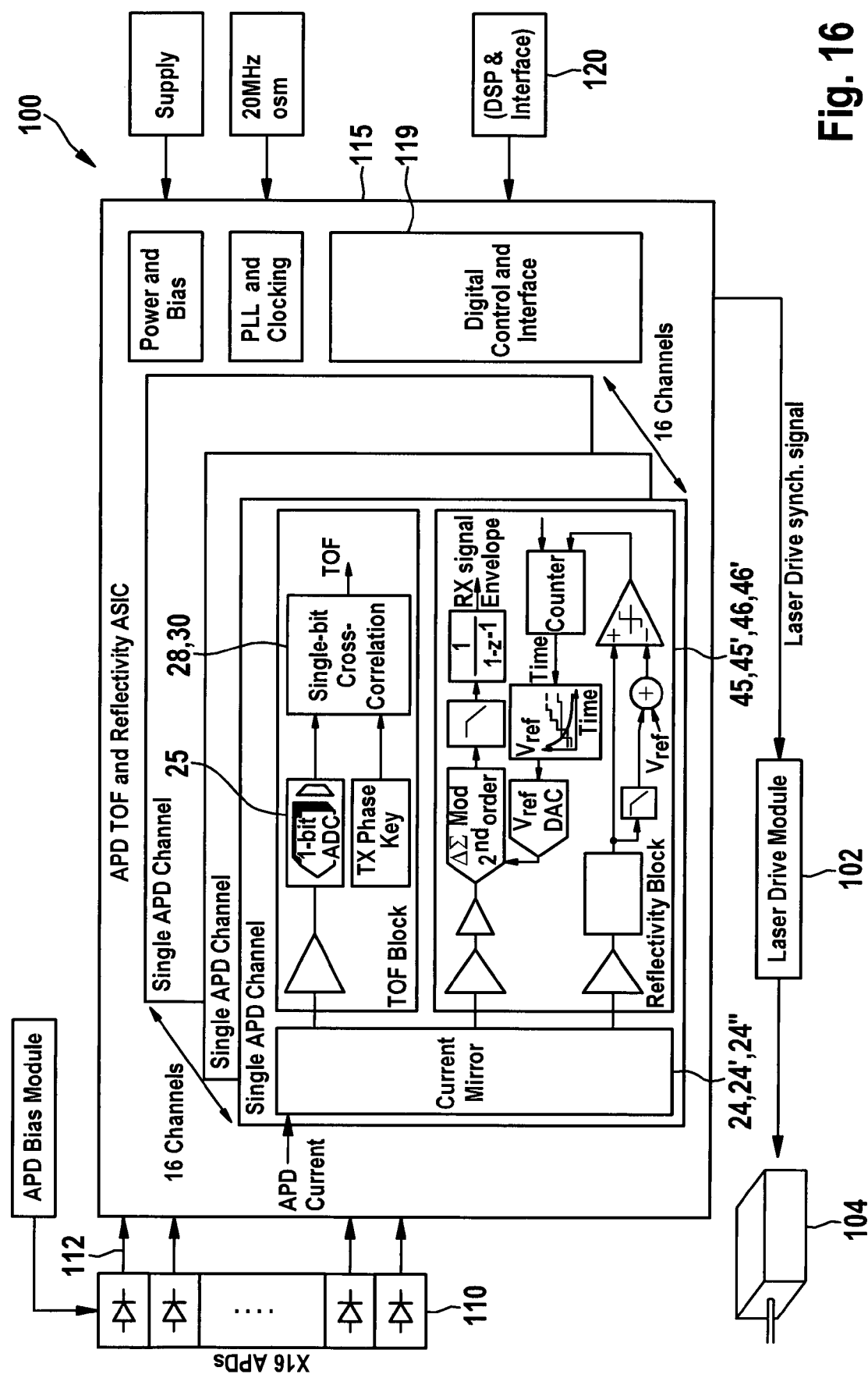
FIG. 16 is a system diagram of a phase-keyed system for a Lidar system according to one aspect of the present disclosure.

The phase-keyed TX burst Lidar signal paths disclosed herein can be readily integrated into an ASIC, incorporating the TOF and intensity channels. As shown in FIG. 16, a Lidar system 100 can include a laser driver module 102 that includes the phase-keyed TX burst generator 12 that is operable as described above to drive the light source or laser 104 to provide the pulsed transmitted light signal TX. The system 100 further includes received light signal RX circuitry provided on an ASIC 115. The reflected light RX is received by an array of a plurality of photodetectors 110, which can be avalanche photodiodes or PIN diodes, each generating an output current 112 that is supplied to the RX circuitry of the ASIC 115. In the illustrated embodiment sixteen such photodiodes are provided in the array. The ASIC includes the time-of-flight path circuitry and the intensity measurement circuitry described above, with the current mirror of the front-end 24, 24', 24" providing the photodiode current to the ADC 25 and single-bit cross-correlator 28, 30 for generating the TOF signal and to the measurement circuitry 45, 45', 46, 46' for generating the intensity signal. The TOF and intensity signals are output from the ASIC through a digital control and interface 119 to a digital signal processor or other suitable interface 120 for use by the Lidar system. It is appreciated that the ASIC 115 is populated with multiple channels corresponding to the number of photodiodes—sixteen in the illustrated example.

The digital control and interface 119 is also configured to control the phase-keyed burst of the laser 104. The digital control aspect of the interface 119 applies the phase coding sent to the drive module 102 and to the RX circuitry of the ASIC 115. The interface can also be configured to randomly select the phase coding from a selection of codes to minimize the risk of interference with other Lidar systems.

The present disclosure provides a Lidar system with a transmitted light signal TX architecture that provides multi-pulse, phase-keyed burst for the laser TX in which the phase coding is selected to maximize the slew-rate of an auto-correlation with the received light signal RX. In specific examples, the coding is a Barker code or other similar code that improves the slew rate by creating a suppression of auto correlation side lobes compared to the peak. This use of a phase-keyed burst allows for a reduction of TX laser peak power which significantly reduces the complexity of the Lidar system by making use of the eye-safe energy level available, which then leads to a reduction in system cost. The TX architecture disclosed herein also avoids or minimizes interference with Lidars of other vehicles by randomly selecting the TX phase key from a pool of phase keys, all with optimized auto-correlation slew-rate, each time the Lidar performs a TX and RX operation to measure TOF and intensity.

The present disclosure also provides a Lidar system with a received light signal RX architecture that uses a current-domain analog front-end rather than a traditional transimpedance amplifier (TIA). This feature allows the use of a current mirror to copy the signal from the photodetectors for parallel intensity measurement. Use of the phase-keyed TX burst for cross-correlation based TOF measurement frees the system from the amplitude measurement for TOF required by prior Lidar systems. In one aspect, bitstream domain cross-correlation uses XOR gate as a multiplier. The RX architecture of the present disclosure contemplates parallel paths for measuring TOF and intensity. In one approach, a progressive zoom-in path is provided with an ADC embedded between a switched capacitor differentiator followed and a digital integrator, thereby forming a hybrid (analog/digital) rectangular impulse response filter with its width matched with the TX burst length. Zoom-in happens in time as the signal amplitude is a function of distance (TOF) so that a lower resolution ADC can be used with gain preceding it that zooms in until the reflection arrives. In another approach, two parallel paths are provided that are logarithmically spaced in range, such as one path from 2 to 20 m and another path from 20 m to 200 m. The front-end in this approach is an analog cross-correlator that correlates the phase-keyed TX impulse response through a bank of front-end capacitors used as memory (delay and multiplication in cross-correlation), with a barrel shift sample and hold and charge summation (summation in cross-correlation). The output of charge summation amplifier is followed by a peak detector that detects the analog magnitude of cross-correlation function that is then a DC value to be digitized by a simple ADC. In one variant, a single ADC is shared between the two logarithmically spaced signal paths, with TOF information used to select which analog path's peak detector output should be digitized. A simple comparator after the peak detector can detect the peak of analog cross-correlation function which, when combined with a simple counter, can be used as a redundancy to the precision single-bit cross-correlation based TOF channel in order to reduce the probability of false detection.

In general terms, the disclosure provides systems and methods for a direct time-of-flight (TOF) automotive Lidar system using linear detectors such as the avalanche photo-diode (APD), PIN diodes or silicon photomultipliers. A phase-coded laser burst of multiple pulses is the transmit signal, which is different from the single-pulse transmission used in the state-of-the-art systems. The receive path then incorporates an oversampled single-bit analog-to-digital converter (ADC) embedded in a current-domain analog front-end (AFE) that is then followed by a cross-correlation function. This correlates the bitstream representation of the Lidar receive signal RX with the transmitted phase key from the TX path in order to determine TOF through cross-correlation peak detection. A parallel signal path is provided that can perform the simultaneous measurement of TOF the intensity of the reflected laser.

One benefit of the systems and methods disclosed herein is that they enable lower cost and less complex automotive Lidar systems that meet the expected performance requirements. However, the same methods can be applied to other levels of performance for Lidar systems that are good for industrial or consumer applications (autonomous robots, industrial machines with the need for object avoidance or autonomous motion, interior monitoring, 3D imaging for consumer products, etc.)

This disclosure should be considered as illustrative and not restrictive in character. It is understood that only certain embodiments have been presented and that all changes, modifications and further applications that come within the spirit of the disclosure are desired to be protected.

What is claimed is:

1. A light detection and ranging (Lidar) system, comprising:
   a light transmission component for transmitting TX light to an object or scene, the light transmission component including;
      a light source;
      a driver for activating the light source; and
      a phase-keyed burst pattern generator coupled to said driver and operable to apply a phase-coded key to the driver for activating the light source in a series of on/off pulses; and
   a light receiving component for receiving on/off pulses of RX light reflected from the object or scene, the light receiving component including;
      a light detector operable to generate a current signal in response to detecting the RX light;
      a time-of-flight circuit associated with said light detector including;
         a comparator receiving the signal from said light detector and configured to generate a bit stream corresponding to the on/off pulses of the RX light;
         a cross-correlator receiving the phase-coded key and the signal from the comparator and operable to determine the cross-correlation between the phase-coded key and the signal from the comparator and to provide an output signal indicative of the cross-correlation function; and
         a peak detector receiving the output signal from the cross-correlator and operable to determine the peak of the cross-correlation function and to generate a time-of-flight signal indicative of the time between the transmission of the TX light and the peak of the cross-correlation function;
      a current-domain analog front-end (AFE) receiving the current signal from said light detector, the AFE including a current mirror with two outputs, one of the outputs connected to said comparator to provide the signal from said light detector to the comparator, and
      a measurement circuit connected to the other of the two outputs of said AFE, said measurement circuit configured to measure the magnitude of the current signal from said light detector and operable to provide an output signal indicative of the intensity of the RX light received by said light detector.

2. The Lidar system of claim 1, wherein said phase-coded key is selected from codes having a high auto-correlation peak-to-side lobe ratio or slew rate near the peak.

3. The Lidar system of claim 1, wherein said phase-keyed burst pattern generator is operable to select from a plurality of codes for said phase-coded key.

4. The Lidar system of claim 3, wherein said phase-keyed burst pattern generator is operable to randomly select from said plurality of codes for said phase-coded key.

5. The Lidar system of claim 1, wherein said AFE further includes a filter between said light detector and said current mirror.

6. The Lidar system of claim 5, wherein said filter is configured to block a DC current from passing to said current mirror.

7. The Lidar system of claim 1, wherein said measurement circuit includes:
  an analog differentiator receiving said current signal from said light detector;
  an analog-to-digital converter (ADC) converting an analog output of said differentiator to a digital signal; and
  a digital integrator receiving said digital signal.

8. The Lidar system of claim 7, wherein:
  said series of on/off pulses of said light source define a sequence of a pre-determined number of pulses; and
  said analog differentiator includes a plurality of switched capacitors operating sequentially on said current signal at a sample-and-hold frequency, said plurality of switched capacitors numbering one more than said number of pulses.

9. The Lidar system of claim 7, wherein said ADC includes a sigma-delta modulator and a low pass filter.

10. The Lidar system of claim 1, wherein said measurement circuit includes:
  an analog shift register receiving the current signal from said light detector;
  a summing amplifier receiving the output from said analog shift register;
  a peak detector operable to detect the peak of the output from said summing amplifier; and
  an analog-to-digital converter providing said output signal indicative of the intensity of the RX light received by said light detector.

11. The Lidar system of claim 10, wherein:
  said series of on/off pulses of said light source define a sequence of a pre-determined number of pulses; and
  said analog shift register includes a plurality of switched capacitors and a like plurality of sample-and-hold buffer amplifiers numbering one more than twice said pre-determined number of pulses.

12. The Lidar system of claim 11, wherein said analog shift register includes a barrel shift multiplexer selector operable to select among said plurality of switched capacitors to be charged by said current signal from said light detector.

13. The Lidar system of claim 1, wherein said light detector is an avalanche photodiode or a PIN diode.

14. The Lidar system of claim 1, wherein:
  said light detector includes a plurality of photodetectors; and
  each of said plurality of photodetectors has an associated time-of-flight circuit.

* * * * *